United States Patent Office 3,585,182
Patented June 15, 1971

3,585,182
QUATERNIZED TRIAZOLIUMAZO - 4 - PHENYL-THIOMORPHOLINO-1,1-DIOXIDE DYESTUFFS
James M. Straley and John G. Fisher, Kingsport, Tenn., assignors to Eastman Kodak Company, Rochester, N.Y.
No Drawing. Filed Feb. 28, 1968, Ser. No. 708,754
Int. Cl. C09b 29/36, 62/82; D06p 1/02
U.S. Cl. 260—157    4 Claims

ABSTRACT OF THE DISCLOSURE

Triazolium-azo compounds produce yellow to red dyeings, having excellent fastness to light, on acrylic, modacrylic and acid-modified textile materials and have a quaternized triazolyl diazo component and a 4-phenyl-thiomorpholino-1,1-dioxide coupling component.

---

This invention relates to certain novel monoazo compounds and to acrylic, modacrylic, and acid-modified polyester textile materials dyed with the novel azo cations.

The novel monoazo cations of the invention have the formula (I)    $R\overset{\oplus}{-}N\diagup\!\!\diagdown\!\!\diagdown\!\!\!-N=N-R^1-\underset{\underset{R^2}{|}}{N}-R^3 \; Z^{\ominus}$ wherein A represents the remainder of a 5 or 6 membered heterocyclic aromatic ring system attached to the azo group through a ring carbon atom in which ring system the quaternary nitrogen adjacent to A is a ring member linked ot the azo group through a continuous chain of conjugation, the ring atoms of A consisting of carbon or carbon and at least one oxygen, sulfur or nitrogen atom;
R represents lower alkyl or benzyl;
$R^1$, when taken singly, represents a p-phenylene radical;
$R^2$, when taken singly, represents a lower alkyl radical or benzyl;
$R^3$, when taken singly, represents vinylsulfonylethyl;

$-R^1-\underset{\underset{R^2}{|}}{N}-$ when taken collectively, represents a 1,2,3,4-tetrahydroquinoline radical, a 1,6-benzomorpholinylene, or a 1,3-indolylene; and $-\underset{\underset{R^2}{|}}{N}-R^3$ when taken collectively, represent N-thiomorpholino-1,1-dioxide; and Z represents an anion.

The novel monoazo compounds of the invention give yellow to blue dyeings on acrylic, modacrylic and acid-modified polyester textile material. The dyeings of the novel cations on such textile material exhibit excellent fastness properties, for example, fastness to light, washing, alkaline perspiration, and wet and dry sublimation.

Illustrative of the diazo radicals from which the residues represented by A are derived are the thiazoles, benzothiazoles, 4,5,6,7 - tetrahydrobenzothiazoles, pyrazoles, 1,3,4 - thiadiazoles, isothiazoles, pyridines, quinolines, imidazoles, benzimidazoles, triazoles, oxazoles, benzoxazoles, indazoles, tetrazoles and indoles. The carbon atoms of the diazo radical, i.e., the groups collectively represented by A and the quaternary nitrogen atom in Formula I except, of course, the carbon atom attached to the azo group, can be substituted with various substituents including a fused carbocyclic ring which can also be substituted. Examples of such substituents are hydrogen, lower alkyl, lower alkoxy, lower alkanoylamino, aroylamino, nitro, halogen, cyano, lower alkylsulfonyl, arylsulfonyl, carbamoyl, lower alkylcarbamoyl, di-lower alkylcarbamoyl, benzamido, lower alkoxycarbonyl, hydroxy, lower alkanoyl, aroyl, lower alkylsulfonamido, sulfamoyl, loweralkylsulfamoyl, di-lower alkylsulfamoyl, thiocyanato, alkylthio, aryl, aryloxy, arylamino, etc. As used herein, the word "lower" denotes an alkyl moiety having up to about 4 carbon atoms.

Examples of the alkyl and alkoxy groups that can be present on the diazo component include methyl, ethyl, propyl, isopropyl, butyl, isobutyl, methoxy, ethoxy, propoxy, etc. Bromine and chlorine are representative of the halogen atoms. Acetyl, propionyl, butyryl, acetamido, propionimido, and butyramido are representative of the alkanoyl and alkanoylamino groups that can be present on the diazo component.

Typical alkylsulfonyl and alkylsulfonamido groups that can be present on the diazo component of the cations of the invention are methylsulfonyl, ethylsulfonyl, propylsulfonyl, butylsulfonyl, 2-cyanoethylsulfonyl, methylsulfonamido, ethylsulfonamido, butylsulfonamido, etc. Examples of the alkoxycarbonyl groups include methoxycarbonyl, ethoxycarbonyl, propoxycarbonyl, butoxycarbonyl, etc. Typical of the alkyl groups of the alkylthio, substituted carbamoyl, and substituted sulfamoyl groups that can be present on the diazo component are methyl, ethyl, propyl, isopropyl, butyl, etc.

Examples of the aryl groups that can be present on the diazo compound include monocyclic, carbocyclic aryl such as phenyl and phenyl substituted with lower alkyl, lower alkoxy, halogen, nitro, cyano, etc. The aryl moiety of the aroyl, aroylamino, arylamino, aryloxy, and arylsulfonyl groups can be unsubstituted, e.g., benzoyl, benzamido, phenylsulfonyl, or substituted with the groups mentioned above in the definition of aryl.

Any secondary nitrogen atoms present in the group represented by A can be substituted with lower alkyl, lower alkylsulfonyl, arylsulfonyl or aryl, as those groups are defined above. Examples of diazo groups containing a secondary nitrogen atom are the pyrazoles, the benzimidazoles, and the triazoles.

The examples and types of substituents described above are illustrative and not limitative. Various substituents that can be present on the diazo component will be apparent to those skilled in the art.

Examples of the alkyl groups represented by R include methyl, ethyl, propyl, isopropyl, butyl and phenylalkyl groups such as benzyl. Preferably R is methyl, ethyl, or benzyl.

The p-phenylene radicals represented by $R^1$ can be unsubstituted or substituted p-phenylene. Examples of the substituents which can be present on the p-phenylene represented by $R^1$ include alkyl, alkoxy, halogen, alkylthio, alkylamino, alkylsulfonamido, aroylamino, arylsulfonamido, etc. Examples of such substituents are described above in the definition of A. The preferred p-phenylene radicals represented by $R^1$ have the formula wherein X which is attached to the carbon adjacent to the carbon atom to which the azo group is attached, represents hydrogen, lower alkyl, lower alkoxy, halogen, lower alkanoylamino, or lower alkylsulfonamido; and
Y represents hydrogen, lower alkyl, lower alkoxy, or halogen.

The alkyl radical represented by $R^2$ can be straight- or branch-chain, unsubstituted or substituted alkyl. Typical substituents that can be present on the alkyl radicals include hydroxy, e.g. 2-hydroxyethyl, 3-hydroxypropyl; cyano, e.g. 2-cyanoethyl; halogen, 2-chloroethyl, 3-bromopropyl; lower alkanoyloxy, e.g. 2-acetoxyethyl; succinimido, e.g. 2-succinimidoethyl; phenylcarbamoyloxy, e.g. 2-phenylcarbamoyloxyethyl, phenyl, e.g. benzyl; carbamoyl, e.g. 3-carbamoylpropyl; etc. Preferably, the alkyl radicals represented by $R^2$ are unsubstituted and substituted lower alkyl.

The 1,2,34-tetrahydroquinolin-1,6-ylene radical, collectively represented by $$-R^1-N(R^2)-$$

can be unsubstituted or substituted, for example, with lower alkyl, lower alkoxy, halogen, lower alkylthio, lower alkanoylamino, lower alkylsulfonamido, etc. Preferred tetrahydroquinoline radicals have the formula

[structure with X, Q, Q¹, Q²]

wherein

Q, $Q^1$, and $Q^2$ are the same or different and each represents hydrogen or lower alkyl, and
X is defined above.

The benzomorpholine radicals represented collectively by $$-R^1-N(R^2)-$$

conform to the formula

[structure with X, O, Q, Q¹]

wherein Q, $Q^1$ and X are defined above. The indole radicals represented collectively by $$-R^1-N(R^2)-$$

have the formula

[indole structure with $R^4$, $R^5$]

wherein $R^4$ represents hydrogen, lower alkyl, phenyl, or phenyl substituted with lower alkyl, lower alkoxy, or halogen, and $R^5$ represents hydrogen, lower alkyl, lower alkoxy, halogen, lower alkoxycarbonyl, or nitro.

One group of the novel compounds of the invention has the formula

[structure with R, Y, N, $R^{11}$, $SO_2$, $Z^-$, X]

wherein

R is lower alkyl or benzyl;
$R^{11}$ is lower alkyl; benzyl; lower alkylsulfonyl; phenylsulfonyl; phenylsulfonyl substituted with lower alkyl, lower alkoxy, chlorine, bromine, nitro or cyano; phenyl; or phenyl substituted with lower alkyl, lower alkoxy, chlorine, bromine, nitro or cyano;
X represents hydrogen, lower alkyl, lower alkoxy, chlorine, bromine, lower alkanoylamino, or lower alkylsulfonamido;
Y represents hydrogen, lower alkyl, lower alkoxy, chlorine or bromine; and
Z represents an anion.

Particularly fast dyeings are obtained by the use of compounds the cations of which have the formula $$R-\overset{\oplus}{N}\diagdown\!\!\diagup\!\!-N=N-R^1-N(R^2)-R^3$$

wherein $$R-\overset{\oplus}{N}\diagdown\!\!\diagup\!\!-$$

represents an azolium group having the formula

[azolium group structures with R, $R^6$, $R^7$, $R^8$, $R^9$, $R^{10}$]

wherein

R represents methyl or ethyl;
$R^6$ represents hydrogen, lower alkyl, or phenyl;
$R^7$ represents hydrogen, lower alkyl, lower alkoxy, lower alkylthio, or 2-cyanoethylthio;
$R^8$ represents hydrogen, lower alkyl, lower alkylthio, or phenyl;
$R^9$ represents lower alkyl, phenyl, phenylsulfonyl, or alkylsulfonyl; and
$R^{10}$ represents hydrogen, lower alkoxycarbonyl, or cyano;
$R^1$, taken singly, represents a p-phenylene radical having the formula

[p-phenylene structure with X]

in which

X is hydrogen or lower alkyl;
$\underline{R^2}$, taken singly, represents lower alkyl;
$\underline{R^3}$, taken singly, represents vinylsulfonylethyl;

$$-R^1-N(R^2)-$$

collectively represent an indole radical having the formula

[indole structure with $R^4$]

wherein $R^4$ represents hydrogen, lower alkyl, phenyl, or lower alkylphenyl;

$$N(R^2)-R^3$$

collectively represent N-thiomorpholino-1,1-dioxide.

Dyeings on acrylic and modacrylic fibers of unusually good fastness properties are obtained from the compounds having the formulas

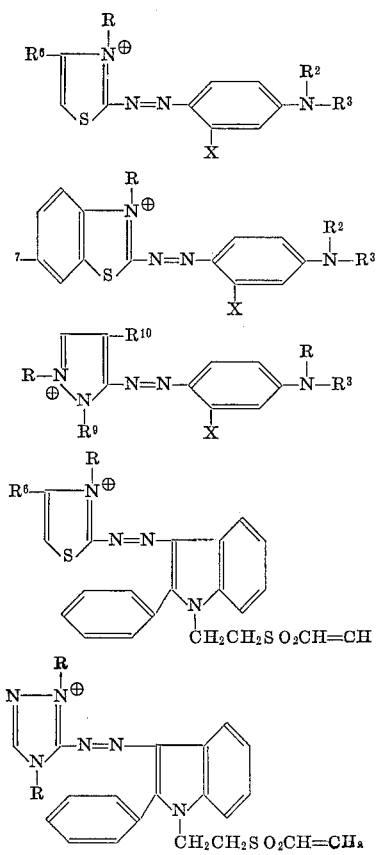

and

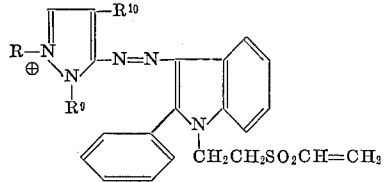

wherein

R represents methyl or ethyl;
$R^2$, taken singly, represents lower alkyl;
$R^3$, taken singly, represents vinylsulfonylethyl;

taken collectively, represents N - thiomorpholino - 1,1-dioxide; and
$R^6$, $R^7$, $R^9$ and $R^{10}$ are defined above.

The novel azo compounds can be prepared by treating the corresponding unquaternized azo compound with an alkylating agent at elevated temperatures. Inert solvents can be employed if desired.

Examples of suitable solvents include chlorobenzene, toluene, 1,2 - dichlorobenzene, triethylphosphate, dimethylformamide, etc. Suitable alkylating agents that can be used are the dialkyl sulfates, the alkyl halides, the aralkyl halides, the alkyl esters of aryl sulfonic acids, etc. Examples of such alkylating agents include dimethyl sulfate, diethyl sulfate, triethyloxonium fluoroborate, ethyl bromide, butyl bromide, methyl iodide, ethyl iodide, benzyl chloride, benzyl bromide, methyl-p-toluene sulfonate, and ethyl benzenesulfonate.

The azo compounds which are alkylated to obtain the novel cationic compounds of the invention are prepared by diazotizing an amine having the formula (II) 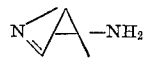

and coupling the resulting diazonium salt with a coupling compound having the formula (III) 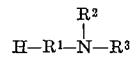

according to conventional techniques, wherein A, $R^1$, $R^2$, and $R^3$ are defined above.

The amines of Formula II are commercially available or can be prepared according to published techniques. Examples of such amines useful in preparing the novel compounds and cations of the invention are 2-aminothiazole,
2-amino-4-phenylthiazole,
2-amino-4-p-anisylthiazole,
2-amino-4-p-bromophenylthiazole,
2-amino-4,5-dimethylthiazole,
2-amino-5-nitrothiazole,
2-amino-5-methylsulfonylthiazole,
2-amino-5-thiocyanatothiazole,
2-amino-5-ethoxycarbonylmethylthiothiazole,
2-amino-5-bromothiazole,
2-aminobenzothiazole,
2-amino-6-methylsulfonylbenzothiazole,
2-amino-6-methylbenzothiazole,
2-amino-6-methoxybenzothiazole,
2-amino-6-ethoxybenzothiazole,
2-amino-4,7-dimethoxybenzothiazole,
2-amino-5,6-dimethylbenzothiazole,
2-amino-4,6-dichlorobenzothiazole,
2-amino-6-methylthiobenzothiazole,
2-amino-6-(2-cyanoethylthio)benzothiazole,
2-amino-6-cyanobenzothiazole,
2-amino-6-nitrobenzothiazole,
2-amino-6-sulfamoylbenzothiazole,
2-amino-6-dimethylsulfamoylbenzothiazole,
2-amino-6-trifluoromethylbenzothiazole,
2-amino-5-methyl-6-acetylbenzothiazole,
2-amino-6-ethoxycarbonylbenzothiazole,
2-amino-6-acetamidobenzothiazole,
2-amino-6-methylsulfonamidobenzothiazole,
2-amino-6-thiocyanatobenzothiazole,
2-amino-6-carbamoylbenzothiazole,
2-amino-4,5,6,7-tetrahydrobenzothiazole,
2-amino-5,5-dimethyl-7-oxo-4,5,6,7-tetrahydrobenzothiazole,
2-amino-5-methylthio-1,3,4-thiadiazole,
2-amino-5-(ethoxycarbonylmethylthio)-1,3,4-thiadiazole,
2-amino-5-methylsulfonyl-1,3,4-thiadiazole,
3-amino-1,2,4-triazole,
2-aminobenzimidazole,
2-amino-5-methylbenzimidazole,
2-amino-6-methylsulfonylbenzimidazole,
2-amino-6-chlorobenzimidazole,
3-aminoindazole,
3-aminoisothiazole,
3-amino-5-nitroisothiazole,
2-amino-4,5-dimethylisothiazole,
3-aminopyrazole,
5-amino-4-cyano-1-phenylsulfonylpyrazole,
3-amino-4-cyanopyrazole,
3-amino-4-nitropyrazole,
3-amino-4-ethylpyrazole,
3-amino-4-ethoxycarbonylpyrazole,
3-amino-4-methoxycarbonyl-2-phenylpyrazole,
5-aminotetrazole, etc.

In general, any amino-cyclic compound which can be diazotized, and conforms with the definition of the diazo component in Formula I, can be used to prepare the novel compounds of the invention.

The novel monoazo compounds of the invention can also be prepared by the oxidative coupling technique described in U.S. Pat. 3,043,828. This technique comprises reacting a hydrazone having the formula (IV)

with a compound of Formula III in the presence of a dehydrogenating or oxidizing agent. In Formula IV, H represents the residue corresponding to A in Formula I except that the unsaturation in H is so arranged that one of the double bonds is external on the ring as shown in IV and in U.S. Pat. 3,043,828. Examples of such hydrazones are 3-methyl-2-thiazolone-hydrazone, 3 - ethyl-2-benzothiazolone-hydrazone, 1 - methyl-2-pyridone-hydrazone, 1-methyl-4-pyridone-hydrazone, 3-methyl-2-benzoxazolone-hydrazone, 1-methyl-2-quinolinone-hydrazone, 1,3,3-trimethyl-2-oxindole-hydrazone, etc. The hydrazones of Formula IV can be substituted with the substituents which can also be present on the group represented by A.

The couplers of Formula III which contain a thiomorpholine-1,1-dioxide group are prepared by the reaction of divinyl sulfone with a wide variety of anilines at elevated temperatures. Examples of the thiomorpholine-1,1-dioxide couplers, which have the formula

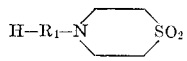

include

N-phenylthiomorpholine-1,1-dioxide,
N-m-tolyl-thiomorpholine-1,1-dioxide,
N-m-chlorophenylthiomorpholine-1,1-dioxide,
N-m-methoxyphenylthiomorpholine-1,1-dioxide,
N-2,5-dimethoxyphenylthiomorpholine-1,1-dioxide,
N-2-methoxy-5-acetamidophenylthiomorpholine-1,1-dioxide,
N-2-methyl-5-methoxyphenylthiomorpholine-1,1-dioxide, etc.

The couplers of Formula III which contain a vinylsulfonylethyl group are prepared by reacting equimolar portions of divinylsulfone with substituted or unsubstituted aniline, tetrahydroquinoline, benzomorpholine, or indole compounds in the presence of an inert solvent and acetic acid. Examples of such compounds include N-ethyl-N-vinylsulfonylethylaniline,
N-ethyl-N-vinylsulfonylethyl-m-tolidine,
N-methyl-N-vinylsulfonylethyl-m-anisidine,
N-(2-hydroxyethyl)-N-vinylsulfonylethyl-3-acetamidoaniline,
N-vinylsulfonylethyl-1,2,3,4-tetrahydroquinoline,
N-vinylsulfonylethyl-2,2,4,7-tetramethyl-1,2,3,4-tetrahydroquinoline,
N-vinylsulfonylethyl-2,7-dimethyl-1,2,3,4-tetrahydroquinoline,
N-vinylsulfonylethyl-2-methyl-7-methyl-sulfonamido-1,2,3,4-tetrahydroquinoline,
N-vinylsulfonylethyl-2-isopropyl-7-methoxy-1,2,3,4-tetrahydroquinoline,
N-vinylsulfonylethyl-7-chlorobenzomorpholine,
N-vinylsulfonylethyl-7-ethyl-benzomorpholine,
N-vinylsulfonylethylindole,
N-vinylsulfonylethyl-2-methylindole,
N-vinylsulfonylethyl-2-phenyl-5-ethoxyindole,
N-vinylsulfonylethyl-2-phenyl-6-methoxycarbonylindole, etc.

Examples of the anions represented by Z include $Cl^-$, $Br^-$, $I^-$, $CH_3SO_4^-$, $C_6H_5SO_3^-$, etc. theh anion depending upon the method of isolation utilized and the particular quaternizing agent employed. The anion does not effect the utility of the cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. Since the cation of a cationic azo dye is responsible for the color of the compound and the particular anion associated with the cation is not important, the novel monoazo cations of the inventions are described herein and in the examples without being associated with any anion.

The preparation of representative azo cations, including the couplers and azo compounds from which the cations are prepared, is further illustrated by the following examples.

PREPARATION OF THE COUPLERS

Example 1

Aniline (46.5 g,, 0.5 m.) and divinylsulfone (59.0 g., 0.5 m.) are stirred in a steam bath for three hours. The mixture is cooled and 750 cc. of 6% HCl are added. Steam is blown through until the mixture boils and solution is almost complete. The product crystallizes on cooling. The white solid is filtered off, washed with water and dried to obtain N-phenylthiomorpholine-1,1-dioxide having a melting point of 118–120° C.

Example 2

N-ethyl-N-β-vinylsulfonylethylaniline is prepared by refluxing 23.6 g. of divinylsulfone, 24.2 g. N-ethylaniline, and 105 ml. of toluene for 24 hours. The toluene is removed under reduced pressure and the product is distilled at 167–183° C./0.75 mm.

N-ethyl-N-β-vinylsulfonylethyl-m-toluidine is prepared by substituting 27 g. of N-ethyl-m-toluidine for the aniline reactant in Example 2 and distilling the product at 157–159° C./0.35 mm.

Example 3

A solution of 6.75 g. β-anilinoethanol, 5 ml. acetic acid, and 125 ml. toluene are added over a period of 1½ hours to a refluxing solution of 61 g. of divinylsulfone in 125 ml. toluene. The solution is stirred and heated at reflux for 4 hours and the solvent and low boiling material are removed under reduced pressure. Distillation of the residue on a cyclic falling film molecular still at 140–145° C. at 3–6 microns gives the product, N-β-hydroxyethyl-N-β-vinylsulfonyl-ethylaniline.

Example 4

N - β - vinylsulfonylethyl - 2,7 - dimethyl - 1,2,3,4-tetrahydroquinoline is prepared by refluxing 80.5 g. of 2,7 - dimethyl - 1,2,3,4 - tetrahydroquinoline, 65 g. of divinylsulfone, 200 ml. toluene, and 10 ml. of acetic acid for 24 hours. The solvent is removed and the product, distilled under vacuum, had a boiling point of 199–207° C. at 1.1 to 1.5 mm. Hg.

When 0.5 m. of the analogous tetrahydroquinoline reactant is employed in the procedure described in Example 4, the following couplers are obtained. N-β-vinylsulfonylethyl - 2,2,4,7 - tetramethyl - 1,2,3,4 - tetrahydroquinoline, N - β - vinylsulfonylethyl - 1,2,3,4 - tetrahydroquinoline, and N - β - vinylsulfonylethyl - 7 - methoxy-2-methyl-1,2,3,4-tetrahydroquinoline.

Example 5

A solution of 7-methylbenzomorpholine, 36 g. divinylsulfone, 100 ml. toluene, and 5 ml. acetic acid are refluxed for 24 hours. The solvent and unreacted starting material are removed under reduced pressure and the product distilled at 209° C./1.2 mm. to yield 27 g. of N-β-vinylsulfonylethyl-7-methylbenzomorpholine.

PREPARATION OF THE MONOAZO CATIONS

Example 6

0.72 g. NaNO₂ is added portionwise to 5 ml. conc. H₂SO₄. The pale yellow solution is cooled and 10 ml. 1:5 acid is added below 15° C. This mixture is cooled further to about 0° C. and 1.00 g. 2-aminothiazole is added, followed by 10 ml. 1:5 acid, all below 5° C. After stirring 2 hr. at 0° C., this is added to a chilled solution of 2.11 g. N-phenyl-thiomorpholine-1,1-dioxide in 50 ml. 1:5 acid plus 10 ml. 15% H₂SO₄, all at about 5° C. The coupling mixture is kept cold and solid ammonium acetate is added until a test sample turns Congo Red test paper brown. After allowing to couple 2 hr. at 5–10° C., the mixture is drowned into water. The orange product is collected by filtration, washed with water and air dried.

The azo compound (1.0 g.) prepared above is dissolved in chlorobenzene (25 ml.) by heating. This solution is treated by dropwise addition with dimethyl sulfate (1.5 ml.) in chlorobenzene (10 ml.) at 95–100° C. After addition is complete the reaction mixture is heated 1½ hr. longer at the same temperature. After cooling to room temperature, precipitation of the dye is completed by addition of a small volume of ether. The quaternary dye is filtered off, washed with a little ether and dried in a vacuum. This cation imparts fast, bright, violet shades to acrylic fibers and has the formula:

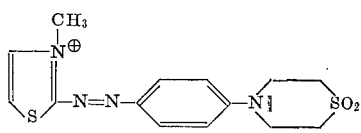

Example 7

1.28 g. 2-amino-4,5-dimethylthiazole is diazotized as in Example 6 and added to a chilled solution of 2.11 g. N-phenylthiomorpholine-1,1-dioxide dissolved in 50 ml. 1:5 acid plus 25 ml. 15% H₂SO₄, all at 0–5° C. The reaction mixture is allowed to stand 1 hr. at about 5° C., with occasional stirring, and then drowned further with water. The product is collected by filtration, washed with water, and air dried. One gram of the azo compound is quaternized as described in Example 6. The cation obtained imparts fast violet shades to acrylic fibers and has the structure:

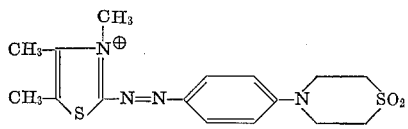

Example 8

To 2.9 g. of 2-amino-4-phenylthiazole stirred in 25 cc. water is added 13.6 cc. conc. H₂SO₄. Immediate solution results. The solution is cooled to −10° C. and a solution of 1.4 g. NaNO₂ in 10 cc. conc. is added below −5° C. Stirring at about −5° C. is continued for 15 min. This diazonium solution is then added to a chilled solution of 4.5 g. N-(m-tolyl)-thiomorpholine-1,1-dioxide dissolved in 25 ml. 1:5 acid (1 part propionic:5 parts acetic acid) plus 75 ml. 15% H₂SO₄. The temperature is kept at 0–5° C., for 30 minutes and then the coupling mixture is drowned further with water. The azo compound is collected by filtration, washed with water, and air dried. The azo compound (1.0 g.) is quaternized with dimethyl sulfate according to the alkylation procedure employed in Example 6. The cation obtained gives violet dyeings on acrylic and modacrylic fibers and has the formula:

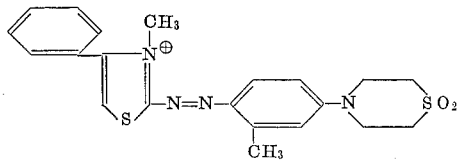

Example 9

1.45 g. 2-amino-4-methylthiazole is diazotized as in Example 6 and added to a chilled solution of 3.12 g. N-(5-acetamido - 2 - ethoxyphenyl)thiomorpholine - 1,1 - dioxide dissolved in 100 cc. 15% H₂SO₄, all at about 5° C. After allowing to couple 1 hr. at 5–10° C., the mixture is drowned with water, and the product collected by filtration, washed with water, and air dried. The azo product (1.0 g.) is heated in 10 ml. of diethyl sulfate at 95–100° C. for 2 hours. The blue solution is drowned in ether, the etheral solution is decanted from the gummy precipitate. The latter is dissolved in water, filtered and the dye precipitated by addition of KI. The cation obtained dyes acrylic fibers a bright, fast, blue shade and has the formula:

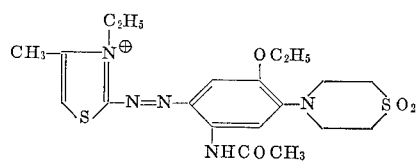

Example 10

A solution of nitrosyl sulfuric acid is prepared by careful addition of 0.72 g. NaNO₂ to 5 ml. conc. H₂SO₄. This solution is cooled to about 3° and 10 ml. 1:5 acid (1 part propionic acid:5 parts acetic acid) is added below 15° C. Then at below 10° C. 1.00 g. 2-aminothiazole is added, followed by 10 ml. 1:5 acid. The reaction is stirred 2 hours at 0–5° C., then added to a solution of 2.53 g. N-ethyl-N-β-vinylsulfonylethyl-m-toluidine in 25 ml. 1:5 acid. The solution is neutralized to brown on Congo Red paper with solid ammonium acetate, coupled two hours and then drowned in water. The azo compound is filtered off and washed with water. The azo compound (1.0 g.) is heated in 10 ml. of dimethyl sulfate on a steam bath for 2½ hours. The reaction mixture is drowned in ether and dried. The azo cation obtained gives fast, reddish blue dyeings on acrylic and modacrylic fibers and has the formula:

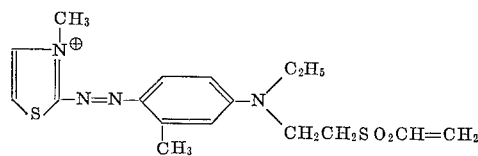

Example 11

A diazonium solution is prepared as described in Example 10 substituting 1.58 g. of 2-amino-5-thiocyanatothiazole for the 2-aminothiazole and adding to a solution of 2.67 g. N-β-hydroxyethyl-N-β-vinylsulfonylethyl-m-toluidine in 25 ml. 1:5 acid. The azo compound is isolated according to the procedure described in the preceding example and 1.0 g. of the azo compound is quaternized with dimethyl sulfate as described in Example 6. The azo cation obtained imparts fast blue-violet shades to acrylic fibers and has the formula:

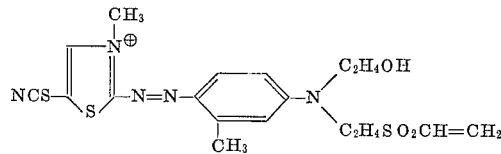

Example 12

Nitrosyl sulfuric acid is prepared from 0.72 g. sodium nitrite and 5 ml. conc. sulfuric acid. The solution is then cooled to 15° C. and 10 ml. 1:5 acid is added below 20° C. Then at below 5° C., 1.79 g. 2-amino-5-bromothiazole is added followed by 10 ml. 1:5 acid. The solution is stirred for two hours at −5° C. to 5° C. and added to a chilled solution of 2.38 g. N-methyl-N-β-vinylsulfonylethyl-m-toluidine in 25 ml. 1:5 acid. The coupling mixture is neutralized to a brown color on Congo Red paper with ammonium acetate and coupled 1½ hours. The solution is drowned in water, filtered and the precipitate washed with water. Alkylation of the resulting azo compound according to the procedure of Example 6 yields an azo cation which give fast blue violet dyeings on acrylic fibers. The cation has the structure:

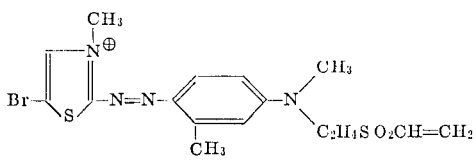

Example 13

A solution of nitrosyl sulfuric acid is prepared by careful addition of 0.72 g. sodium nitrite to 5 ml. conc. sulfuric acid. This solution is cooled to about 3° and 15 ml. 1:5 acid is added below 15° C. Then at below 5.0° C. 1.14 g. 2-amino-4-methylthiazole is added, followed by 15 ml. 1:5 acid. The reaction is stirred 2 hr. at 0–5° C., then added to a solution of 3.07 g. 2,2,4, 7-tetramethyl-1-(2-vinylsulfonylethyl)-1,2,3,4-tetrahydroquinoline in 20 ml. 1:5 acid. The solution is neutralized to brown on Congo Red paper with solid ammonium acetate, coupled two hours, then drowned in water. The precipitate is filtered and washed. One gram of the azo compound is quaternized with dimethyl sulfate as described in Example 6 to obtain an azo cation which gives blue dyeings of excellent fastness properties on acrylic fibers. The cation has the structure:

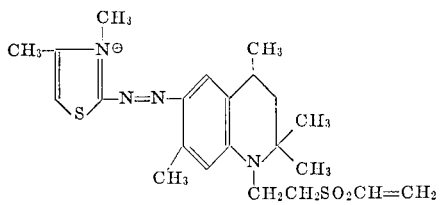

Example 14

A solution of nitrosyl sulfuric acid is prepared by careful addition of 3.6 g. sodium nitrite to 25 ml. sulfuric acid below 80° C. The solution is cooled to 15° C. and 50 ml. of 1:5 acid is added below 20° C. The resulting solution is further cooled to 3° C. and 5.0 g. of 2-aminothiazole is added below 5° C. An additional 50 ml. of 1:5 acid is added and the reaction mixtures stirred for 2 hours. The diazonium solution is added to a chilled solution of 14.0 g. of N-β-vinylsulfonylethyl-7-methylbenzomorpholine in 100 ml. of 1:5 acid. After neutralization with ammonium acetate to a brown color on Congo Red paper, the coupling is continued for 2 hours. The azo compound is separated by drowning in water and it is then filtered, washed and dried. The azo compound is converted to the corresponding cation by treating it with dimethyl sulfate as described in Example 6. The azo cation imparts fast blue shades to acrylic and modacrylic fibers and has the formula:

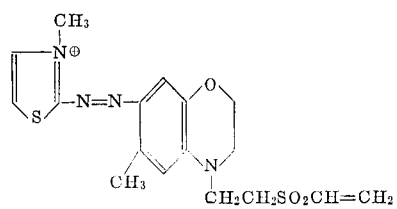

Example 15

A diazonium solution is prepared as described in Example 6. The diazo solution is added to a cooled solution of N-β-vinylsulfonylethyl-2-phenylindole (3.2 g.) in 15 ml. of 1:5 acid. The mineral acid is neutralized by the addition of solid ammonium acetate, maintaining the temperature below 10° C. When the coupling is complete, 500 ml. of water is added with stirring to the coupling mixture. The precipitated azo compound is collected and washed well with water.

The azo compound (0.5 g.) is heated in dimethylsulfate (10 ml.) at 95–100° C. for 1 hr. The red solution is drowned in ether, the ether decanted from the gummy precipitate and the latter dissolved in water by heating. The solution is filtered and the dye precipitated by addition of NaCl and $ZnCl_2$. This cation imparts fast red shades to acrylic fibers and has the structure:

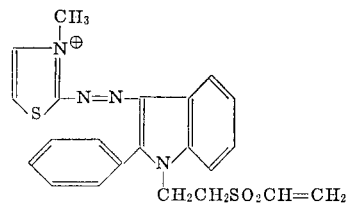

Example 16

To 1.80 g. of 2-amino-6-methoxybenzothiazole suspended in 24 ml. of water is added 26.2 g. conc. $H_2SO_4$. After all the amine has dissolved, the solution is cooled and a solution of 0.72 g. $NaNO_2$ in 5.0 ml. conc. $H_2SO_4$ is added portionwise below 0° C. The diazotization is stirred for 2 hr. at about 0° C. and then added to a solution of 2.25 g. N-(m-tolyl)thiomorpholine-S,S-dioxide dissolved in 75 ml. of 15% $H_2SO_4$, all below 15° C. The temperature is kept at 0–5° C. for 1 hr. and then the coupling mixture is drowned with water. The azo compound is collected by filtration, washed with water, and air dried.

The azo compound (1.0 g.) is heated in dimethylsulfate (8 ml.) at 95° C. for 2½ hours. The blue solution is drowned in ether and the ether decanted from the gummy precipitate of the quaternary methosulfate. Water is added and the dye dissolves to give a clear bright blue solution. Solid NaCl is added with stirring whereupon the product precipitates. It is collected on a filter and washed with a very small amount of water. This cation imparts fast blue shades to acrylic fibers and has the structure:

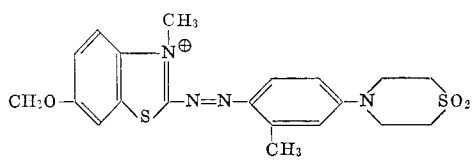

Example 17

Sodium nitrite (0.76 g.) is added portionwise to 5 ml. conc. $H_2SO_4$. This solution is cooled in ice-bath and 10 ml. 1:5 acid (1 part propionic:5 parts acetic) is added, keeping the temperature below 15° C. This mixture is stirred at 0–5° C. and 1.80 g. 2-amino-6-methoxybenzothiazole is added at 0–5° C., followed by 10 ml. 1:5 acid. The diazotization is stirred at 0–5° C. for 2 hr. and then added to a cold solution of 2.11 g. N-(phenyl)thiomorpholine-1,1-dioxide in 75 ml. 1:5 acid plus 25 ml. 15% $H_2SO_4$. The coupling is buffered with solid ammonium acetate and allowed to react at ice-bath temperature for 2 hr. It is then drowned with water and the product is filtered, washed with water, and air dried.

The azo compound (0.5 g.) is dissolved in dimethyl formamide (5 ml.) by heating. Dimethylsulfate (2 ml.) is added and the quaternization brought about by heating in the steam bath for 2 hr. The blue solution is drowned in water (400 ml.) containing a few ml. of HCl. This aqueous solution is heated on the steam bath for ½ hr. to hydrolyze the excess dimethylsulfate. After allowing to cool the product is precipitated by addition of NaCl. This cation imparts fast blue shades to acrylic fibers and has the structure:

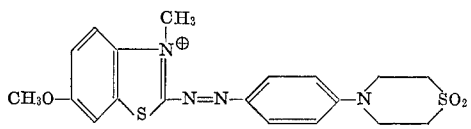

Example 18

A solution of 1.80 g. of 2-amino-6-methoxybenzothiazole in 50 g. 50% aqueous sulfuric acid is cooled to −5° C. and a solution of 0.72 g. of $NaNO_2$ is dissolved in 5 ml. conc. $H_2SO_4$ is added, keeping the temperature less than 0° C. The diazotization reaction is stirred 1.75 hr. at 0° C., then added to a solution of 2.53 g. N-ethyl-N-β-vinylsulfonylethyl-m-toluidine dissolved in 100 ml. 15% $H_2SO_4$, all at about 5° C. The coupling is continued at this temperature for 2 hr., then drowned with water, filtered, washed with water, and the azo compound is dried in air. Quaternization of the azo compound, as described in Example 16 yields the corresponding azo cation. This cation gives blue dyeings of excellent fastness properties on acrylic fibers and has the structure:

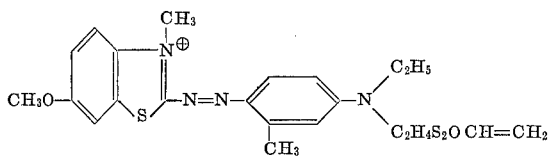

Example 19

0.72 g. sodium nitrite is added portionwise to 5 ml. conc. $H_2SO_4$; the solution cooled in an ice bath to about 2° C. and 10 ml. 1:5 acid (1 part propionic:5 parts acetic) is added below 15° C. Then at below 10° C., 2.08 g. 2-amino-6-thiocyanobenzothiazole is added, followed by 10 ml. 1:5 acid. The reaction mixture is stirred 2 hr. at 0–5° C. and added to a solution of 2.39 g. N-ethyl-N-β-vinylsulfonylethylaniline dissolved in 100 ml. 1:5 acid at 5° C. Solid ammonium acetate is added until the solution turned Congo Red paper brown and the coupling allowed to stand 2 hr. at ice bath temperature. It is then drowned with water, filtered, washed with water, and air dried. The azo product is treated with dimethyl sulfate as described in Example 16 to obtain a cation which imparts fast blue shades to acrylic fibers and has the formula

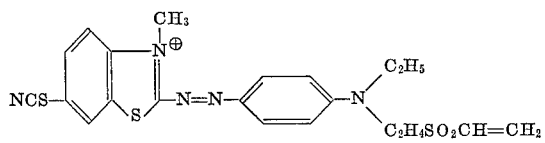

Example 20

1.79 g. 2-amino-6-ethylbenzothiazole is suspended in 24 ml. water. To this is added, with stirring, 14 ml. conc. $H_2SO_4$. The solution is cooled to −5° C. and a solution of 0.72 g. $NaNO_2$ in 5 ml. conc. $H_2SO_4$ was added at less than 0° C. After stirring at about 0° C. the solution is added to a solution of 2.53 g. N-ethyl-β-vinylsulfonylethyl-m-toluidine dissolved in 100 ml. 15% $H_2SO_4$, all at about 5° C. The coupling is continued at this temperature for 2 hr., then drowned with water, filtered, washed with water, and dried in air. The azo product is quaternized with dimethyl sulfate as in Example 16. The resulting cation dyes acrylic and modacrylic fiber fast blue shades. It has the structure:

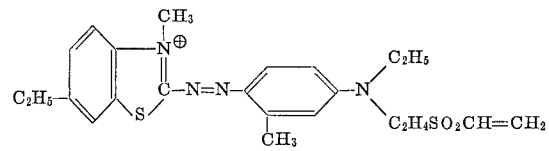

Example 21

1.50 g. 2-aminobenzothiazole is diazotized exactly as described in Example 20. The diazonium solution is then added to a solution of 2.73 gg. N-ethyl-N-β-vinylsulfonyl-ethyl-m-chloroaniline in 100 ml. 15% $H_2SO_4$, keeping the temperature below about 10° C. After allowing to couple 1 hr. the reaction mixture is drowned with water, filtered, washed with water, and dried in air. The azo product is treated with diethyl sulfate as described in Example 10. The cation obtained gives fast blue dyeings on acrylic fibers and has the formula:

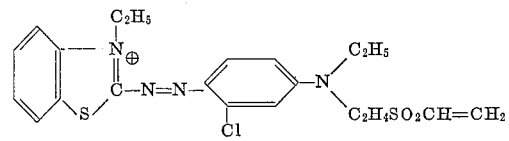

Example 22

1.84 g. 2-amino-6-chlorobenzothiazole is placed in 24 ml. water and then 14 ml. conc. $H_2SO_4$ are added with stirring. The solution is cooled and a solution of 0.72 g. $NaNO_2$ in 5 ml. conc. $H_2SO_4$ is added below 5° C. After stirring at about 0° C. for 2 hr. the diazonium solution is added to a solution of 2.97 g. N-β-acetoxyethyl-N-β-vinylsulfonylethylaniline dissolved in 50 ml. of 15% $H_2SO_4$ all at about 5° C. The coupling mixture is allowed to stand 2 hr. at this temperature and then it is drowned with water and the product is filtered, washed with water and air dried. The azo product (1.0 g.) is heated in 15 ml. of benzyl chloride at 95–100° C. for 2 hours. The solution is allowed to cool and then treated slowly with ether. The quaternary dye separates, is filtered off and dried. It imparts blue shades to acrylic fibers and has the structure:

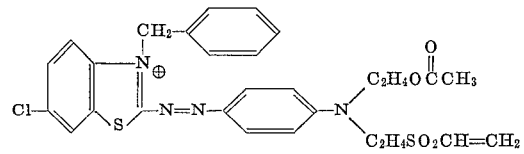

Example 23

1.50 g. 2-aminobenzothiazole is diazotized using the procedure described in Example 20. The diazonium solution is added to a solution of 2.39 g. N-methyl-N-β-vinyl-sulfonylethyl-m-toluidine in 50 ml. 15% $H_2SO_4$ at 5° C. The coupling is completed and the azo compound is isolated and quaternized as described in Example 20. The cation obtained imparts bright, fast, blue shades to acrylic fiber and has the structure:

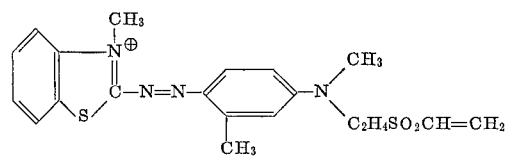

Example 24

1.50 g. of 2-aminobenzothiazole is placed in 24 ml. water and then 14 ml. conc. $H_2SO_4$ is added with stirring. The solution is cooled and a solution of 0.72 g. $NaNO_2$ in 5 ml. conc. $H_2SO_4$ is added below 5° C. After stirring at about 0° for 2 hr. the diazonium solution is added to a solution of 3.07 g. of 2,2,4,7-tetramethyl-1,2,3,4-tetrahydro-1,β-vinylsulfonylethylquinoline dissolved in 100 ml.

1:5 acid (1 part propionic, 5 parts acetic acid) at 5° C. Solid ammonium acetate is added until the solution turned Congo Red paper brown and the coupling allowed to stand for 2 hr. at ice bath temperature. It is then drowned in water, filtered, washed with water, and air dried. The azo product is treated with dimethyl sulfate as described in Example 16. The cation obtained dyes acrylic fibers fast greenish-blue shades and has the structure:

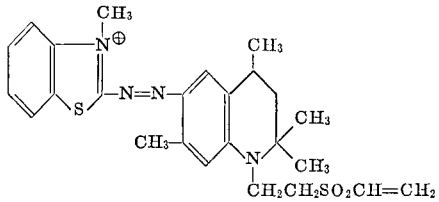

Example 25

A slurry is prepared of 1.81 g. 2-amino-6-methoxy-benzothiazole in 24 ml. of water and 14 ml. conc. sulfuric acid was added with stirring. The solution is cooled and a solution of 0.72 g. NaNO₂ in 5 ml. conc. H₂SO₄ is added below 5° C. After stirring at 0° C. for 2 hr. the diazonium solution is added to a solution of 2.81 g. of N-β-vinyl-sulfonyl-7-methylbenzomorpholine dissolved in 50 ml. 15% sulfuric acid all at about 5° C. The coupling mixture is allowed to stand at this temperature for 2 hr. and then drowned with water, filtered, washed with water and air dried. The product thus obtained is treated with dimethyl sulfate as described in Example 16. This cation imparts greenish-blue shades to acrylic and modacrylic fibers and has the formula:

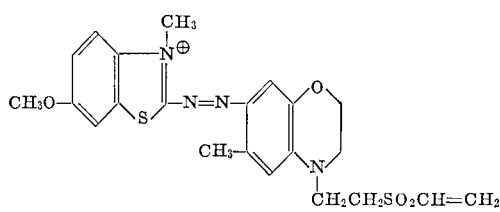

Example 26

Using the same procedure as in Example 6 but substituting 1.01 g. 2-amino-1,3,4-thiadiazole for the 2-aminothiazole, the resulting diazonium solution is coupled with 2.78 g. N-β-vinylsulfonylethyl-2,7-dimethyl-1,2,3,4-tetrahydroquinoline and the resulting azo compound is quaternized with dimethyl sulfate. The cation obtained imparts violet shades to acrylic fibers and has the structure:

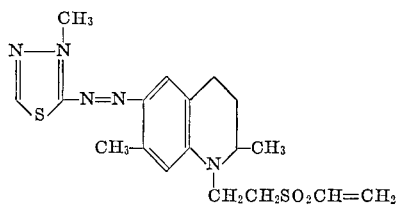

Example 27

3-amino-1(H),1,2,4-triazole (0.84 g.) is dissolved in acetic acid (10 ml.) and conc. HCl (3 ml.). This solution is cooled to 0° C. and treated with a solution of NaNO₂ (0.72 g.) in water keeping the temperature below 5° C. After the diazotization is complete, the solution is added to an ice cooled suspension of 3.2 g. of N-β-vinylsulfonylethyl-2-phenylindole in 1-5 acid (20 ml.). The coupling mixture is neutralized to congo brown by addition of solid NH4OAc keeping the temperature below 10° C. After completion of coupling (as shown by a negative R-salt test), water is added and the azo product collected, washed with water and air dried. 1 g. of the azo compound is dissolved in 5 ml. of dimethylformamide and treated with 2 ml. of dimethylsulfate. After heating for 2 hours on a steam bath, the solution is drowned in 200 ml. of water containing 3 ml. of concentrated HCl, 2 g. of ZnCl₂ and 30 g. of NaCl. The precipitated dye is collected on a funnel, washed with 5 ml. of water and air dried. This cation gives yellow dyeings having excellent fastness properties on acrylic fibers. It has the structure:

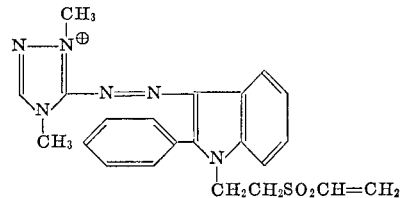

Example 28

A diazonium solution is prepared as in Example 27 and is added to a chilled solution of 2.25 g. of N-m-tolyl-thiomorpholine-1,1-dioxide in 50 ml. of 1:5 and 10 ml. of 15% sulfuric acid, all at about 5° C. The coupling mixture is kept cold and solid. Ammonium acetate is added until a test sample turns Congo Red test paper brown. After allowing to couple 2 hours at 5-10° C., the mixture is drowned into water. The azo compound is collected by filtration, washed with water, and air dried. 1 g. of the azo compound is treated with dimethyl sulfate as described in Example 27. The resulting cation imparts fast red shades to acrylic, modacrylic, and acid-modified polyester fibers. It has the structure:

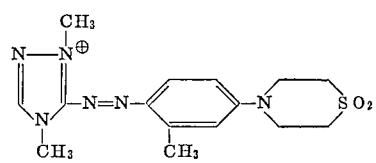

Example 29

Ten ml. of 1:5 acid is added to a solution of nitrosulfuric acid prepared from 0.72 g. sodium nitrite and 5 ml. sulfuric acid. The solution is cooled to 3° C. and 3-amino-pyrazole-4-carboxylic acid methyl ester (1.41 g.) is added below 5° C. followed by a second portion of 10 ml. of 1:5 acid at the same temperature. The diazotization is completed by stirring for 2 hours at 3–5° C. The diazo solution is added to a cooled solution of 2.11 g. N-phenylthiomorpholine-1,1 dioxide in 15 ml. of 1:5 acid. The mineral acid is neutralized by the addition of solid ammonium acetate maintaining the temperature at 10° C. or below. When the coupling is complete, 500 ml. of water is added with stirring. The precipitated azo compound is collected and washed well with water. The azo compound (0.5 g.) is dissolved by warming in dimethyl formamide (4 ml.). Dimethyl sulfate (2 ml.) is added to the yellow solution and then the quaternization and accompanying methylation carried out by heating at 95–100° C. for 2 hrs. The orange solution is drowned in water containing a few ml. of hydrochloric acid. The dye is precipitated by addition of NaI and ZnI₂. This cation imparts fast orange shades to acrylic fibers and has the structure:

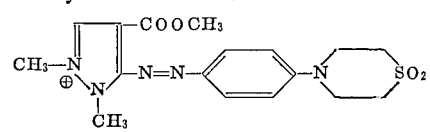

Example 30

1 g. of 3-methylbenzothiazole-2-hydrazone and 1 g. of N-m-tolylthiomorpholine-1,1-dioxide are slurried in 150 ml. of dilute HCl with the aid of a wetting agent such as Triton X-102. This slurry is stirred and treated with 25 ml. of a 20% FeCl₃ solution. After stirring overnight at room temperature the oxidative coupling is complete. The crude dye is collected on a funnel, washed with 10% NaCl solution and then dissolved in 350 ml. of water by heating. The solution is filtered and the dye is precipitated with sodium iodide. This cation imparts blue shades to acrylic fibers and has the formula:

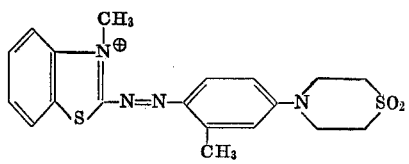

The azo cations set forth below are prepared according to the procedures described above or known techniques analogous to those procedures. The colors given for the following examples of the cations of the invention refer to acrylic fibers dyed with the cations.

Example 31

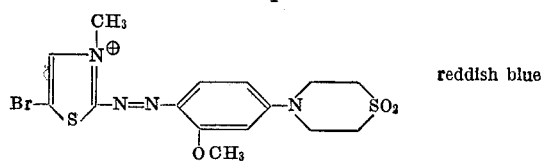     reddish blue

| | | |
|---|---|---|
| Ex. 32.... | 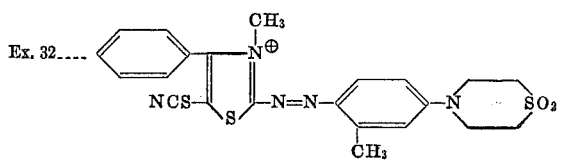 | Reddish-blue. |
| Ex. 33.... | 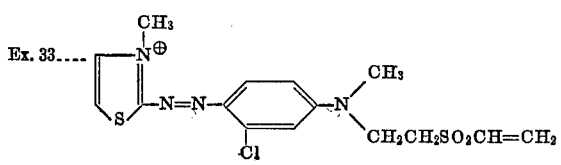 | Blue. |
| Ex. 34.... | 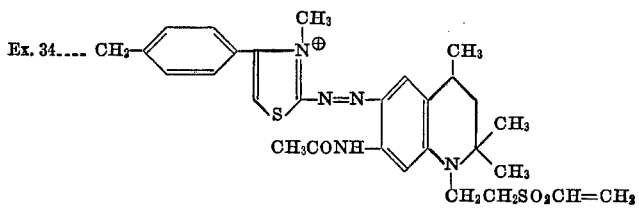 | Do. |
| Ex. 35.... | 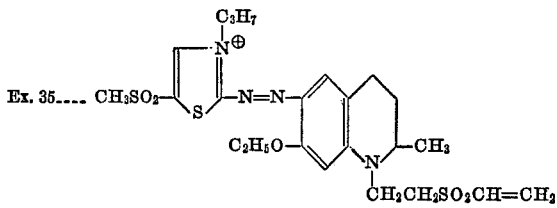 | Do. |
| Ex. 36.... | 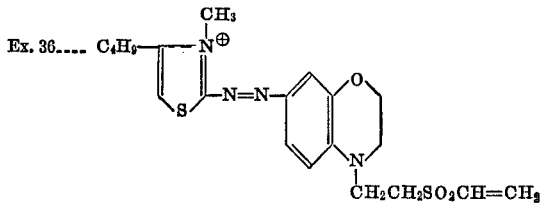 | Do. |
| Ex. 37.... | 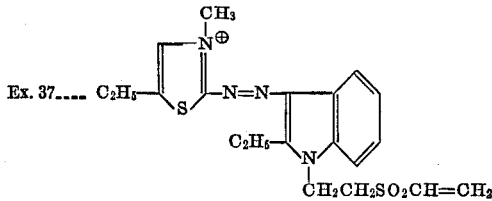 | Red. |
| Ex. 38.... | 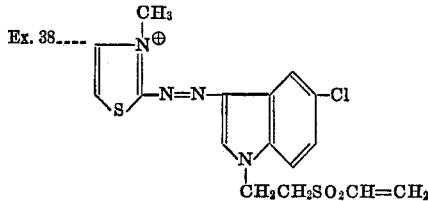 | Do. |
| Ex. 39.... | 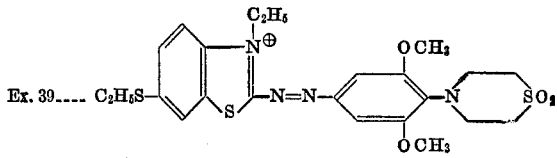 | Blue. |

| | | |
|---|---|---|
| Ex. 40 | 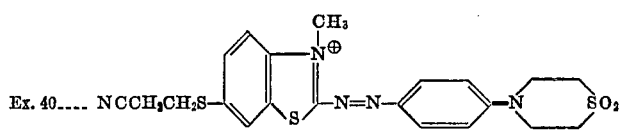 | Do. |
| Ex. 41 | 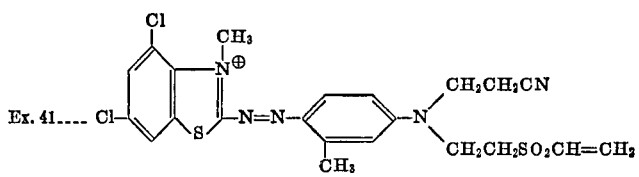 | Do. |
| Ex. 42 | 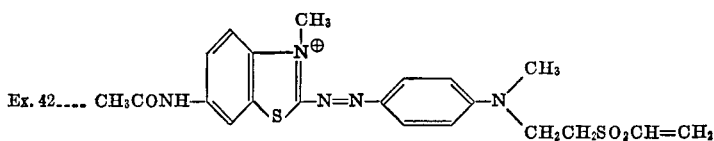 | Do. |
| Ex. 43 | 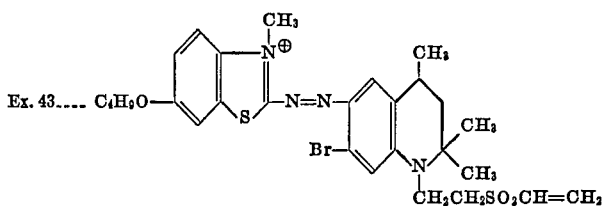 | Greenish-blue. |
| Ex. 44 | 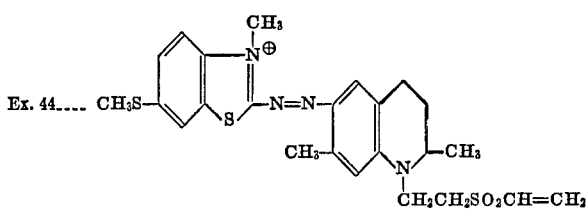 | Do. |
| Ex. 45 | 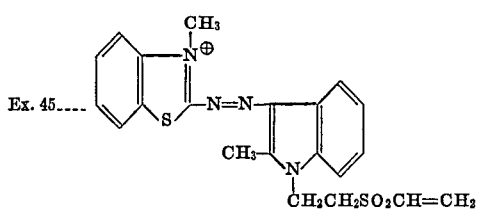 | Violet. |
| Ex. 46 | 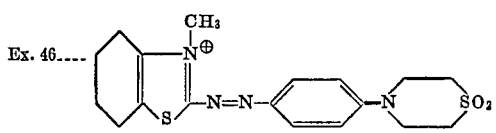 | Bluish-violet. |
| Ex. 47 | 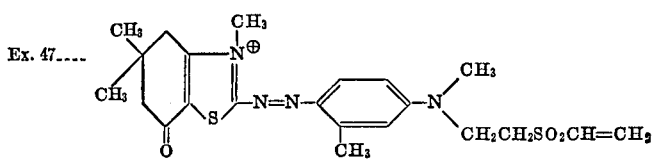 | Blue. |
| Ex. 48 | 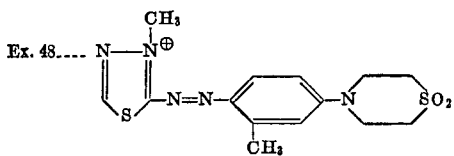 | Reddish-violet. |
| Ex. 49 | 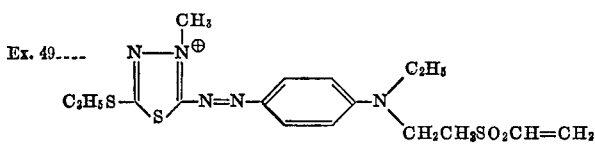 | Violet. |

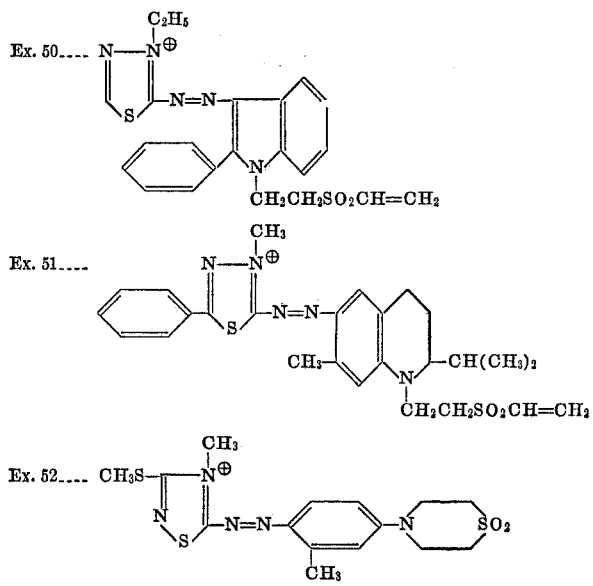
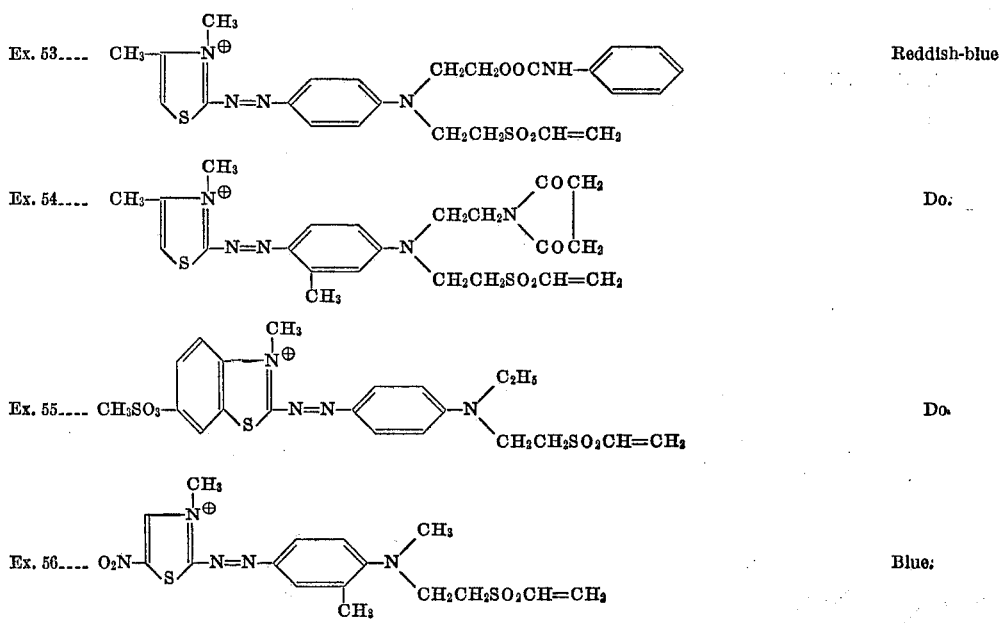
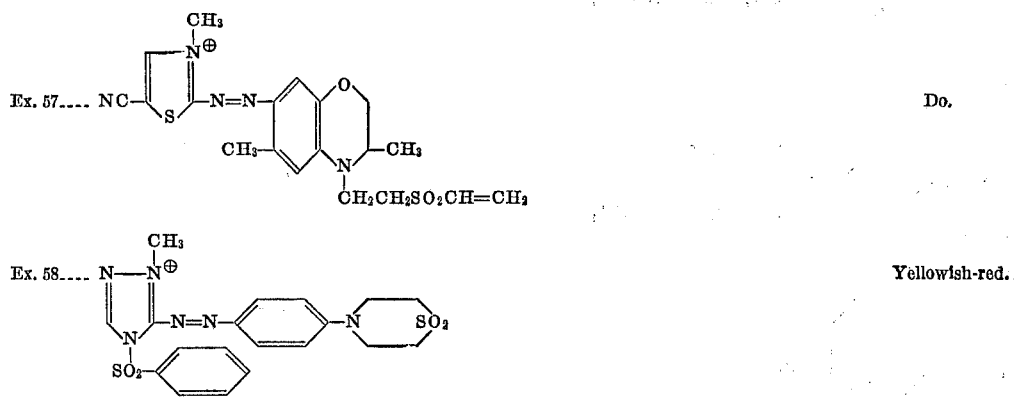
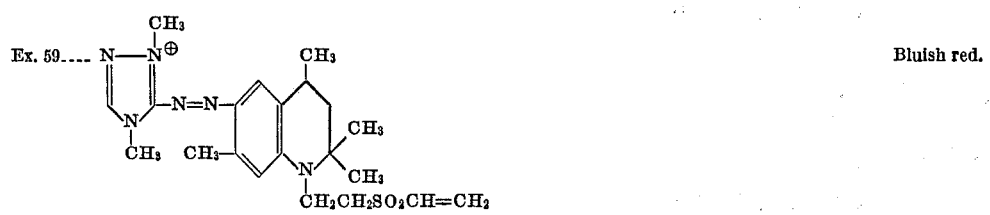
| | |
|---|---|
| Ex. 50 | Yellowish-red. |
| Ex. 51 | Reddish-blue. |
| Ex. 52 | Violet. |
| Ex. 53 | Reddish-blue |
| Ex. 54 | Do. |
| Ex. 55 | Do. |
| Ex. 56 | Blue. |
| Ex. 57 | Do. |
| Ex. 58 | Yellowish-red. |
| Ex. 59 | Bluish red. |

| | | |
|---|---|---|
| Ex. 60 | 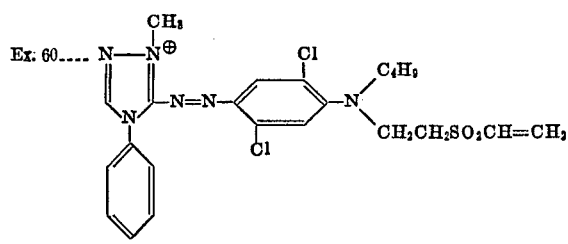 | Orange; |
| Ex. 61 | 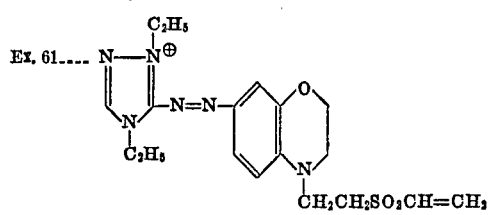 | Bluish-red; |
| Ex. 62 | 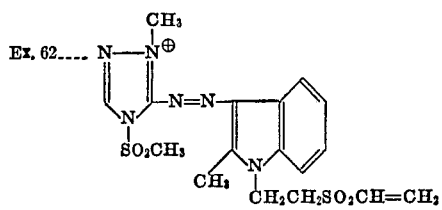 | Yellow; |
| Ex. 63 | 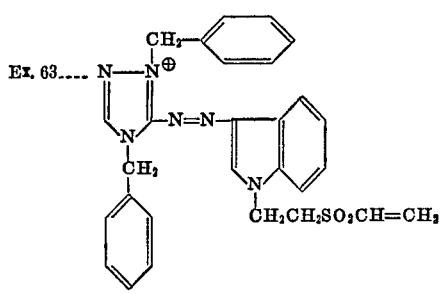 | Do; |
| Ex. 64 | 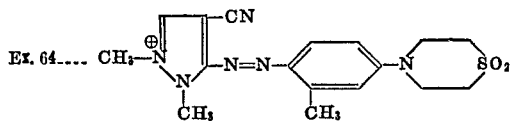 | Bluish-red; |
| Ex. 65 | 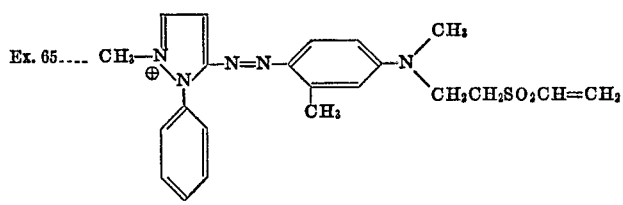 | Red; |
| Ex. 66 | 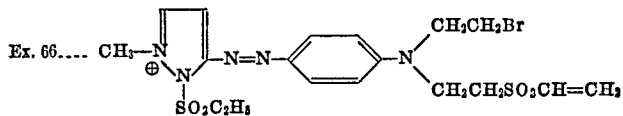 | Do; |
| Ex. 67 | 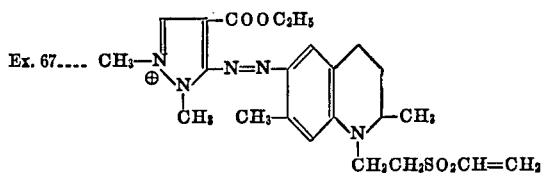 | Bluish-red; |
| Ex. 68 | 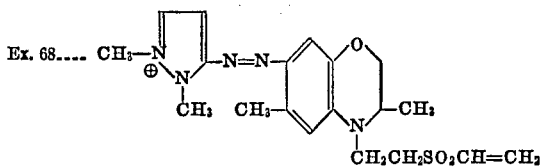 | Red; |

| | | |
|---|---|---|
| Ex. 69.... | 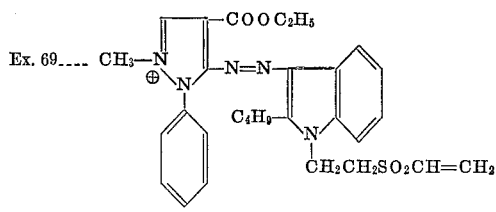 | Yellow. |
| Ex. 70.... | 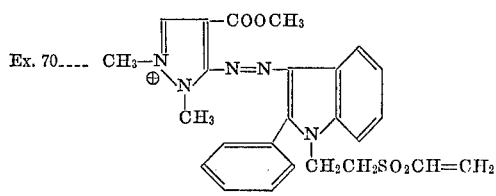 | Do. |
| Ex. 71.... | 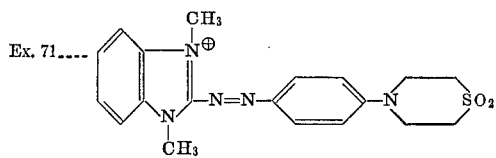 | Violet. |
| Ex. 72.... | 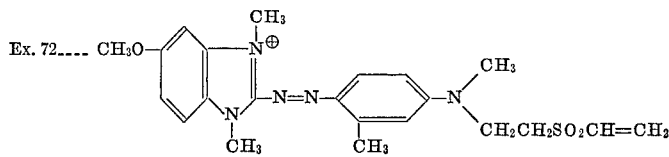 | Blue. |
| Ex. 73.... | 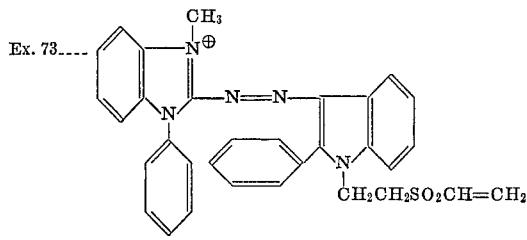 | Bluish-red. |
| Ex. 74.... | 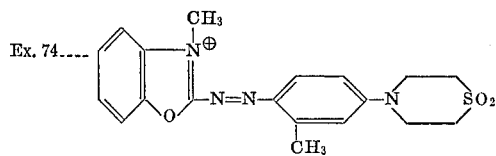 | Violet. |
| Ex. 75.... | 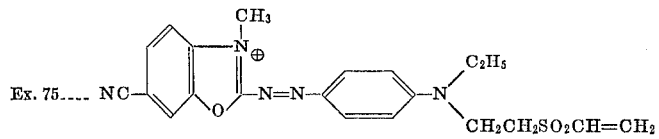 | Reddish-blue. |
| Ex. 76.... | 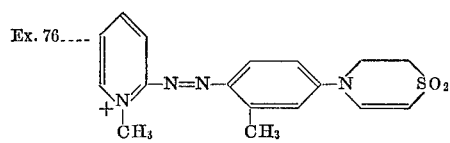 | Reddish-violet. |
| Ex. 77.... | 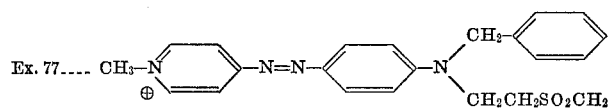 | Violet- |
| Ex. 78.... | 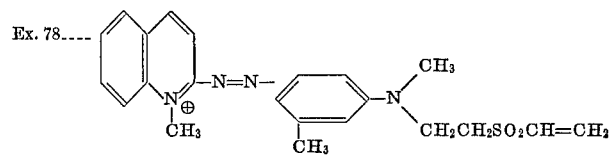 | Reddish-blue |

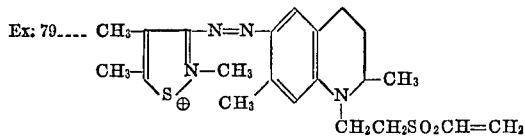

| | | |
|---|---|---|
| Ex. 79 | (structure) | Violet. |
| Ex. 80 | (structure) | Do. |
| Ex. 81 | (structure) | Reddish-blue. |

The monoazo compounds of the invention can be used for dyeing acrylic and modacrylic polymer fibers, yarns and fabrics giving yellow shades when applied thereto by conventional dye methods. Acrylic textile materials are those which consist of at least 85% acrylonitrile and modacrylic textile materials are those consisting of at least 35% but less than 85% acrylonitrile. The compounds of the invention also give excellent dyeings on acid-modified acrylic fibers described in U.S. Pats. 2,837,500, 2,837,501 and 3,043,811. The novel compounds can also be used to dye sulfonate modified polyester fibers such as are described in U.S. Pat. 3,018,272. Examples of the textile materials that are dyed with the compounds of the invention are those sold under the tradenames "Orlon," "Orlon 42," "Verel," "Acrilan," "Dynel," "Creslan," and "Dacron 64." In general, the compounds, when used as dyes on the described textile materials, exhibit improved fastness, for example, to washing, to alkaline perspiration, gas (atmospheric fumes) and sublimation when tested by methods such as described in the A.A.T.C.C. Technical Manual, 1965 edition.

Textile materials dyes by the compounds of the invention are characterized by containing at least about 35% combined acrylonitrile units and up to about 95% acrylonitrile units, and modified, for example, by 65–5% of vinyl pyridine units as described in U.S. Pats. 2,990,393 (Re. 25,533) and 3,014,008 (Re. 25,539) or modified by 65–5% of vinylpyrrolidone units, for example, as described by U.S. Pat. 2,970,783, or modified with 65–5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

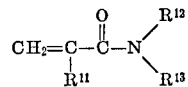

wherein $R^{11}$ is selected from the group consisting of hydrogen and methyl, and $R^{12}$ and $R^{13}$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the compounds of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R^8$, $R^9$ and $R^{10}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the compounds of the invention can be used to dye acrylonitrile polymer textile materials.

Example 82

The dye (0.1 g.) is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made an acrylic fiber is entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dyed material is then washed well with water and dried.

The monoazo compounds can be applied to sulfonate-modified polyester textile materials, such as the fibers sold under the trademark "Dacron 64". The following example illustrates one technique for dyeing such textile materials with the novel azo compounds of the invention.

Example 83

The methosulfate salt (0.1 g.) of the cation is dissolved in 5 ml. of a 5% solution of acetic acid. The dye-acid solution is then added to 300 ml. of water containing 150 mg. of a wetting agent (Igepon T), 1 g. of sodium sulfate, and 1½ ml. of a dyeing assistant such as Latyl Carrier A (a dimethyl terephthalate-benzanilide emulsion). Ten g. of a fabric of "Dacron 64" sulfonate-modified polyester fibers are placed in the dyebath and the bath is slowly brought to the boil. The dyeing is continued at the boil for 1 hour and then the fabric is removed, rinsed with water, scoured in a solution of 0.5 g. Igepon T for 20 minutes at 80° C., rinsed with water, and dried at 250° C. in an oven.

The invention has been described in considerable detail with particular reference to certain preferred embodiments thereof, but it will be understood that variations and modifications can be effected within the spirit and scope of the invention as described hereinabove.

We claim:
1. An azo compound having the formula

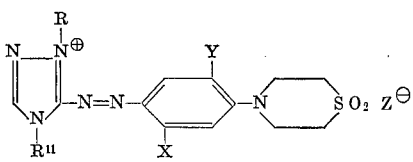

wherein
R is lower alkyl or benzyl;
$R^{11}$ is lower alkyl; benzyl; lower alkylsulfonyl; phenylsulfonyl; phenylsulfonyl substituted with lower alkyl lower alkoxy, chlorine, bromine, nitro or cyano; phenyl; or phenyl substituted with lower alkyl, lower alkoxy, chlorine, bromine, nitro or cyano;
X represents hydrogen, lower alkyl, lower alkoxy, chlorine, bromine, lower alkanoylamino, or lower alkylsulfonamido;
Y represents hydrogen, lower alkyl, lower alkoxy, chlorine, or bromine; and
Z represents an anion.
2. An azo compound according to claim 1 wherein R is lower alkyl;
X represents hydrogen or lower alkyl; and
Y represents hydrogen.
3. An azo compound according to claim 1 having the formula

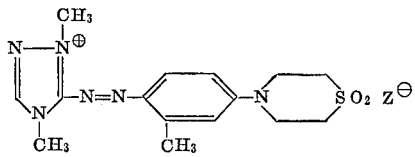

4. An azo compound according to claim 1 having the formula

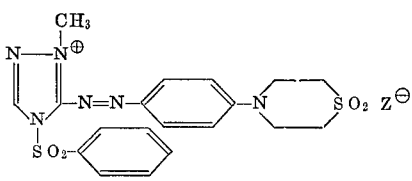

References Cited
UNITED STATES PATENTS

| | | | |
|---|---|---|---|
| 3,202,657 | 8/1965 | Kuhne et al. | 260—152X |
| 3,369,013 | 2/1968 | Weaver et al. | 260—152X |
| 3,379,711 | 4/1968 | Wallace et al. | 260—152 |
| 3,380,991 | 4/1968 | Dale et al. | 260—158 |
| 3,385,842 | 5/1968 | Weaver et al. | 260—158 |
| 3,418,310 | 12/1968 | Dale et al. | 260—158 |

FLOYD D. HIGEL, Primary Examiner

U.S. Cl. X.R.

8—4, 41; 117—138.8; 260—41, 155, 156, 158, 162, 163, 243, 247.1, 283, 288, 289, 296, 305, 326.12, 326.15, 562, 573, 574, 577